United States Patent
Yeh et al.

(10) Patent No.: US 9,267,086 B2
(45) Date of Patent: Feb. 23, 2016

(54) SYNERGISTIC BIOFUEL BLENDS AND RELATED METHODS

(75) Inventors: Lisa I-Ching Yeh, Marlton, NJ (US); Donna I. Hoel, Gibbsboro, NJ (US); Paul P. Wells, Mullica Hill, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 528 days.

(21) Appl. No.: 13/521,870

(22) PCT Filed: Jan. 10, 2011

(86) PCT No.: PCT/US2011/020652
§ 371 (c)(1),
(2), (4) Date: Jul. 12, 2012

(87) PCT Pub. No.: WO2011/087977
PCT Pub. Date: Jul. 21, 2011

(65) Prior Publication Data
US 2012/0285078 A1 Nov. 15, 2012

Related U.S. Application Data

(60) Provisional application No. 61/295,416, filed on Jan. 15, 2010.

(51) Int. Cl.
*C10L 1/19* (2006.01)
*C10L 1/02* (2006.01)

(52) U.S. Cl.
CPC ......... *C10L 1/026* (2013.01); *C10G 2300/1014* (2013.01); *C10G 2300/1018* (2013.01); *C10G 2300/1055* (2013.01); *C10G 2300/1059* (2013.01); *C10G 2300/30* (2013.01); *C10G 2300/304* (2013.01); *C10L 1/19* (2013.01); *C10L 2200/043* (2013.01); *C10L 2200/0446* (2013.01); *C10L 2270/026* (2013.01); *C10L 2300/30* (2013.01); *Y02E 50/13* (2013.01); *Y02P 30/20* (2015.11)

(58) Field of Classification Search
USPC .......................................................... 44/388
See application file for complete search history.

(56) References Cited

U.S. PATENT DOCUMENTS

2008/0005957 A1* 1/2008 Sell et al. ........................ 44/308
2008/0282605 A1 11/2008 Kremer et al.
2010/0009875 A1* 1/2010 Dong ............................ 508/202

FOREIGN PATENT DOCUMENTS

| KR | 782130 B1 | 12/2007 |
| WO | 2005028597 A1 | 3/2005 |
| WO | 2008104929 A1 | 9/2008 |
| WO | 2009085033 A1 | 7/2009 |

OTHER PUBLICATIONS

Park, Ji-Yeon et al., "Blending effects of biodiesels on oxidation stability and low temperature flow properties", Bioresource Technology, (2008), pp. 1196-1203, vol. 99.
Moser, Bryan R., "Influcence of Blending Canola, Palm, Soybean and Sunflower Oil Methyl Esters on Fuel Properties of Biodiesel", Energy & Fuels, (2008), pp. 4301-4306, vol. 22.
Sarin, Rakesh et al., "Jatropha—Palm biodeisel blends: An optimum mix for Asia", Fuel, (2007), pp. 1365-1371, vol. 86.
Peterson, Charles L., "Vegetable Oil as a Diesel Fuel: Status and Research Priorities", ASAE Transactions, (1986), pp. 1413-1422, vol. 29, No. 5.

* cited by examiner

*Primary Examiner* — Ellen McAvoy
*Assistant Examiner* — Chantel Graham
(74) *Attorney, Agent, or Firm* — David M. Weisberg

(57) ABSTRACT

The invention provides synergistic biofuel blends comprising a petroleum distillate and two or more fatty acid alkyl ester-containing biofuels. Methods for making synergistic biofuel blends are also provided.

9 Claims, No Drawings

SYNERGISTIC BIOFUEL BLENDS AND RELATED METHODS

CROSS-REFERENCE TO RELATED APPLICATION

This application is a U.S. National Phase application under 35 U.S.C. §371 of PCT Application No. PCT/US2011/020652 filed Jan. 10, 2011, which claims priority to U.S. Provisional Application No. 61/295,416, filed Jan. 15, 2010.

FIELD OF THE INVENTION

The invention provides synergistic biofuel blends comprising a petroleum distillate and two or more fatty acid alkyl ester-containing, biofuels, Methods for making synergistic biofuel blends are also provided.

BACKGROUND OF THE INVENTION

Biodiesel is the name for a variety of ester-based oxygenated fuels made from vegetable oils, fats, greases, or other sources of triglycerides. Biodiesel is a nontoxic and biodegradable blendstock which may be blended with petroleum diesel provided relevant specifications are met. Blends of biodiesel with petroleum diesel can reportedly substantially reduce the emission levels and toxicity of diesel exhaust. Biodiesel has been designated as an alternative fuel by the United States Department of Energy and the United States Department of Transportation, and is registered with the United States Environmental Protection Agency as a fuel and fuel additive.

Because biodiesel is made from numerous different feedstocks (e.g. rapeseed oil and palm oil), including mixed feedstocks, a finished fuel manufacturer is often not aware of the exact feedstock composition of a purchased biodiesel. Biodiesel is commonly referred to by its feedstock source (e.g. rapeseed methyl ester, palm oil methyl ester). Since the performance of a biodiesel depends upon the particular feedstock mixture from Which it was produced, formulators are therefore often unable to predict how the biodiesel will perform in the finished fuel blend. In the case of blends containing two or more biodiesels, it can prove difficult to anticipate whether the blend will afford a performance advantage such as an improved cetane number, or will in fact suffer from a performance disadvantage (such as poor low-temperature operability) that might call for the addition of a performance enhancer.

PCT WO2005028597 discloses fuel blends that contain mixtures of fatty acid methyl esters derived from different sources such as rapeseed methyl ester, palm oil methyl ester.

Sarin, et al., "Jatropha-Palm biodiesel blends: An optimum mix for Asia", *Fuel* 86 (2007) 1365-1371, discloses blends of jatropha and palm biodiesels that have low temperature and oxidative stability properties that are well-suited to use in Asia.

Park, et al., "blending effects of biodiesels on oxidation stability and is low temperature flow properties", *Bioresource Technology* 99 (2008) 1196-1203, predicts the oxidation stability and cold filter plugging point of blends of palm, rapeseed, and soybean biodiesels.

Moser, "Influence of Blending Canola, Palm, Soybean, and Sunflower Oil Methyl Esters on fuel Properties of Biodiesel", *Energy & Fuels* 2008, 22, 4301-4306, discloses fuel properties of single, binary, ternary, and quaternary blends of canola, palm, soybean, and sunflower oil methyl esters.

While the above references reflect efforts to identify the operating properties of biodiesel blends, the need continues to exist for fuels and blending strategies that will yield improved combinations of petroleum distillates and fatty acid alkyl ester-containing biofuels.

SUMMARY OF THE INVENTION

We have discovered novel methods of making biofuel blends by blending a petroleum distillate feedstock with a selected volumetric percentage of two or more fatty acid alkyl ester-containing biofuels. We have also discovered novel biofuel blends comprised of a petroleum distillate feedstock and two or more fatty acid alkyl ester-containing, biofuels. Significantly, blends and methods of the invention enable optimization of biodiesel blends for the particular petroleum fuel selected.

In one aspect of the methods described herein, a sample of a petroleum distillate feedstock is blended with a selected volumetric percentage of two or more fatty acid alkyl ester-containing biofuels. One or more blend properties selected from the group consisting of cloud point, low temperature flow, cold filter plugging point, oxidative stability, cetane number, ignition quality, and conductivity are then determined, and these blend properties are compared with corresponding reference properties. If the one or more blend properties correlate with the corresponding reference properties within an acceptable tolerance, the petroleum distillate feedstock is blended with the selected volumetric percentage of the two or more fatty acid alkyl ester-containing biofuels. If the one or more blend properties do not correlate with the corresponding reference properties within the acceptable tolerance, one or more of the selected volumetric percentage, composition, and/or number of the two or more fatty acid alkyl ester-containing biofuels are varied, the biofuels are blended with another sample of the petroleum feedstock, blend properties are determined and compared with corresponding reference properties, and the process is repeated as necessary until the one or more blend properties correlate with the corresponding reference properties within the acceptable tolerance.

In certain aspects of the methods described herein, the biofuel blend comprises between about 60% to about 90%, or about 62.5% to about 87.5%, or about 65% to about 85%, or about 67.5% to about 82.5%, or about 70% to about 80%, or about 72.5% to about 77.5%, or about 75%, or about 75% to about 80%, or about 70% to about 75%, or about 65% to about 70% by volume of a petroleum distillate and between about 10% to about 40%, or about 12.5% to about 37.5%, or about 15% to about 35%, or about 17.5% to about 32.5%, or about 20% to about 30%, or about 20% to about 25%, or about 22.5% to about 27.5%, or about 25%, or about 20% to about 25%, or about 25% to about 30%, or about 30% to about 35% by volume in total of two or more fatty acid alkyl ester-containing biofuels. The volumetric percentages of each of the two or more fatty acid alkyl ester-containing biofuels can be the same or different.

In certain aspects, the sample of a petroleum distillate feedstock is obtained from one or more refinery slip streams.

In other aspects of the methods described herein, a biofuel blend is made by blending between about 75% to about 85% by volume of a petroleum distillate with about 5% to about 15% by volume of each of two or more fatty acid alkyl ester-containing biofuels.

For example, in certain aspects of the methods described herein, a biofuel blend is made by blending between about 75% to about 85%, or about 76% to about 84%, or about 77% to about 83%, or about 78% to about 82%, or about 79% to about 81%, or about 80% by volume of a petroleum distillate with about 5% to about 15%, or about 6% to about 14%, or about 7% to about 13%, or about 8% to about 12%, or about 9% to about 11%, or about 10% by volume of palm oil methyl ester and about 5% to about 15%, or about 6% to about 14%, or about 7% to about 13%, or about 8% to about 12%, or about 9% to about 11%, or about 10% by volume of by volume of either soybean oil methyl ester or rapeseed oil methyl ester.

In certain aspects of the biofuel blends described herein, the blends comprise between about 75% to about 85%, or about 76% to about 84%, or about 77% to about 83%, or about 78% to about 82%, or about 79% to about 81%, or about 80% by volume of a petroleum distillate with about 5% to about 15%, or about 6% to about 14%, or about 7% to about 13%, or about 8% to about 12%, or about 9% to about 11%, or about 10%, or about 2.5% to about 7.5%, or about 5%, or about 5% to about 10% by volume of palm oil methyl ester and about 5% to about 15%, or about 6% to about 14%, or about 7% to about 13%, or about 8% to about 12%, or about 9% to about 11%, or about 10%, or about 12.5% to about 17.5%, or about 15%, or about 10% to about 15% by volume of either soybean oil methyl ester or rapeseed oil methyl ester.

The novel biofuel blends described herein perform successfully under a variety of operating conditions, as evidenced by properties such as cloud point, conductivity, low temperature flow, cold filter plugging point, ignition quality, iodine value, and modified Rancimat value. These properties are examples and not meant to limit the scope of the invention. One skilled in the art could also use the current invention to optimize other qualities for blends of petroleum fuel and biodiesel such as other measures of oxidation stability, other measures of low temperature quality, deposit control, corrosion stability, fuel dilution, aftertreatment robustness, and oil drain interval.

These and other aspects are described further in the detailed description of the invention.

DETAILED DESCRIPTION OF THE EMBODIMENTS

Unless otherwise stated, all percentages disclosed herein are on a volume basis.

Any end point of a range stated herein can be combined with any other end point to form another suitable range.

The following definitions apply unless indicated otherwise.

A "biodiesel" means a composition that can be used as a fuel for diesel engines and that contains at least about 50% by weight of esters of saturated and unsaturated fatty acids, including fatty acid methyl esters (FAME's), fatty acid ethyl esters (FAEE's), propyl esters of fatty acids, or combinations of two or more methyl, ethyl, and propyl esters. In one example, a biodiesel comprises between about 50% to about 99% by weight of methyl esters of saturated and unsaturated fatty acids, where the methyl esters of saturated and unsaturated fatty acids include $C_8$-$C_{24}$ fatty acid methyl esters, where $C_8$-$C_{24}$ indicates the number of carbons in the original fatty acid.

A "biofuel" includes any fuel comprised of fatty acid alky esters made by the transesterification of a triglyceride with an alcohol. Fatty acid alkyl ester-containing biofuels include, but are not limited to, biodiesels. Biofuels (e.g. biodiesels) can be made by transesterification of one or more vegetable oils, animal fats, algae-derived triglycerides, oils from halophytes, or mixtures thereof (e.g. transesterification of soybean oil, rapeseed oil, palm oil, canola sunflower oil, olive oil, corn oil, tallow oil, coconut oil, jatropha oil, yellow grease, animal fats, used cooking oil, and mixtures thereof) with an alcohol such as methanol or ethanol. In one aspect the fatty acid alkyl esters are largely unsaturated and comprise a rapeseed methyl ester, a canola methyl ester, a soybean methyl ester, a corn oil methyl ester, or a mixture thereof. A 100% biodiesel (B100) should meet ASTM D6751 and/or EN 14214 or EN14213 specifications.

Biofuels (e.g. biodiesels) can contain alkyl esters (e.g. methyl esters) of fatty acids such as myristic acid (C14:0), palmitic acid (C16:0), palmitoleic acid (C16:1), stearic acid (C18:0), oleic acid (C18:1), linoleic acid (C18:2), linolenic acid (C18:3), eicosanoic acid (C20:0), eicosenoic acid (C20:1), docosanoic acid (C22:0), and docosenoic (or erucic) acid (C22:1). The fuel properties of biofuels (e.g. biodiesel) are determined by the amounts of each fatty acid in the feedstock used to produce the esters. Fatty acids are designated by two numbers: the first number denotes the total number of carbon atoms in the fatty acid chain and the second is the number of double bonds present in the chain. For example, 18:1 designates oleic acid, which has 18 carbon atoms and one double bond.

The triglyceride or free fatty acid profiles of a number of common vegetable oils and animal fats are known. See e.g. Peterson, C. L., "Vegetable Oil as a Diesel Fuel: Status and Research Priorities," *ASAE Transactions*, V. 29, No. 5, September-October 1986, pp. 1413-1422.

Biofuel blends (e.g. biodiesel blended with a petroleum distillate such as diesel fuel (Bx)) have a composition reflective of blend ratio and the distillate chosen for the blend.

"Petroleum distillate" includes, but is not mited to, naphtha or middle distillates including kerosene and diesel and mixtures thereof.

A non-limiting example of a "diesel fuel" or "a diesel" is composed of a mixture of $C_9$-$C_{24}$ hydrocarbons that comprise about 50% to about 95% by volume of aliphatic hydrocarbons, of which about 0% to about 50% by volume are cycioparaffins, about 0% to about 5% by volume of olefinic hydrocarbons, and about 5% to about 50% by volume of aromatic hydrocarbons, and which boil at between about 280° F. (138° C.) and 750° F. (399° C.).

A non-limiting example of a "kerosene" comprises about 5% to about 50% by volume of an aromatic fraction, about 0% to about 50% by volume of a cycloparaffin fraction, and about 0% to about 5% by volume of an olefinic fraction, with the rest comprising aliphatic hydrocarbons.

An aromatics fraction can contain methyl aromatics and non-methyl alkyl aromatics. Non-limiting examples of non-methyl alkyl aromatics include molecules such as alkyl benzenes, dialkylbenzenes, alkylnaphthalenes, alkyl biphenyls, and alkyl phenanthrenes, and the like, in which one or more linear or branched alkyl groups containing two or more carbons is bonded to the aromatic ring. Non-limiting examples of methyl aromatics include aromatic molecules such as methylnaphthalene, dimethylnaphthalenes, and the like.

A cycloparaffin fraction consists of cycloalkanes or molecules containing at least one cycloalkane ring. Non-limiting examples of components of the cycloparaftin fraction include alkylcyclohexanes and alkylcyclopentanes.

An olefinic fraction can contain linear, branched, and cyclo-olefins. Non-limiting examples of components of the olefinic fraction include dodecenes and hexadecenes.

A "cetane improver" includes but is not limited to 2-ethylhexyl nitrate (EHN) (e.g. HITEC® 4103, Ethyl Corp., Richmond, Va.), cyclohexyl nitrate, di-tert-butyl peroxide, methyl nitrate, ethyl nitrate, n-propyl nitrate, isopropyl nitrate, allyl nitrate, n-butyl nitrate, isobutyl nitrate, sec-butyl nitrate, tert-butyl nitrate, n-amyl nitrate, isoamyl nitrate, 2-amyl nitrate, 3-amyl nitrate, tert-amyl nitrate, n-hexyl nitrate, 2-ethylhexyl nitrate, n-heptyl nitrate, sec-heptyl nitrate, n-octyl nitrate, sec-octyl nitrate, n-nonyl nitrate, n-decyl nitrate, n-dodecyl nitrate, cyclopentylnitrate, cyclohexylnitrate, methylcyclohexyl nitrate, isopropylcyclohexyl nitrate, and the esters of alkoxy substituted aliphatic alcohols, such as 1-methoxypropyl-2-nitrate, 1-ethoxpropyl-2 nitrate, 1-isopropoxy-butyl nitrate, 1-ethoxylbutyl nitrate, and mixtures thereof.

In one aspect, a biodiesel or biodiesel blend may also include an aromatic amine antioxidant (e.g. a phenylediamine-type antioxidant) such as N,N'-di-sec-butyl-p-phenylenediamine, 4-isopropylaminodiphenylamine, phenyl-naphthyl amine, and ring-alkylated diphenylamines.

A fatty acid alkyl ester-containing biofuel such as a biodiesel or biodiesel blend may also include performance additives such as cold flow additives, cloud point depressants, biocides, conductivity improvers, corrosion inhibitors, metal deactivators, and engine cleaning agents. In some aspects, such additives are present in an amount which ranges from about 0.001 to about 2.0% by weight of the fuel composition.

In certain aspects, biofuel blends described herein can comprise as many as fifteen, or fourteen, or thirteen, or twelve, or eleven, or ten, or nine, or eight, or seven, or six, or five, or four, or three, or two different fatty acid alkyl ester-containing biofuels. The volumetric percentages of each fatty acid alkyl ester-containing biofuel can be the same or different.

In certain aspects of the methods described herein, the biofuel blend comprises between about 60% to about 90%, or about 62.5% to about 87.5%, or about 65% to about 85%, or about 67.5% to about 82.5%, or about 70% to about 80%, or about 72.5% to about 77.5%, or about 75%, or about 75% to about 80% by volume of a petroleum distillate and between about 10% to about 40%, or about 12.5% to about 37.5%, or about 15% to about 35%, or about 17.5% to about 32.5%, or about 20% to about 30%, or about 20% to about 25%, or about 22.5% to about 27.5%, or about 25% or about 20% to about 25% by volume in total of fifteen, or fourteen, or thirteen, or twelve, or eleven, or ten, or nine, or eight, or seven, or six, or five, or four, or three, or two different fatty acid alkyl ester-containing biofuels, wherein the volumetric percentage of each of the fatty acid alkyl ester-containing biofuels can be the same or different. For example, in a biofuel blend which comprises about 20% by volume of four different fatty acid alkyl ester-containing biofuels, the volumetric percentages of each of the biofuels could be about 5%, or the volumetric percentage of one biofuel could be about 10% and the total volumetric percentages of the remaining three biofuels could be about 10%.

In certain aspects of the biofuel blends described herein, the blends comprise between about 75% to about 85%, or about 76% to about 84%, or about 77% to about 83%, or about 78% to about 82%, or about 79% to about 81%, or about 80% by volume of a petroleum distillate with about 5% to about 15%, or about 6% to about 14%, or about 7% to about 11%, or about 8% to about 12%, or about 9% to about 11%, or about 10%, or about 8% to about 11%, or about 7% to about 10%, or about 6% to about 9%, or about 5% to about 8%, or about 4% to about 7%, or about 3% to about 6%, or about 2% to about 5% or about 1% to about 4%, or about 0% to about 3% by volume of each of fifteen, or fourteen, or thirteen, or twelve, or eleven, or ten, or nine, or eight, or seven, or six, or five, or four, or three, or two different fatty acid alkyl ester-containing biofuels, wherein the volumetric percentage of each of the fatty acid alkyl ester-containing biofuels can be the same or different. For example, in a biofuel blend which comprises about 20% by volume of three different fatty acid alkyl ester-containing biofuels, the volumetric percentages of each of the biofuels could be about 6.7%, or the volumetric percentage of one biofuel could be about 10% and the total volumetric percentages of the remaining two biofuels could be about 10%.

A "selected volumetric percentage of two or more fatty acid alkyl ester-containing biofuels" includes, but is not limited to, the volumetric percentages of two or more fatty acid alkyl ester-containing biofuels described above.

Those of ordinary skill in the art are able to determine whether blend properties correlate with the corresponding reference properties (e.g. cloud point, low temperature flow, cold filter plugging point, oxidative stability, cetane number, ignition quality, and conductivity) within an acceptable tolerance based on a variety of considerations, e.g. operating temperatures and engine type. For example, values and characteristics of blends 4 and 6 of Table II herein could be selected as reference properties and a deviation from these values and characteristics of ±about 50%, ±about 40%, ±about 30%, ±about 20%, or ±about 19%, or ±about 18%, or ±about 17%, or ±about 16%, or ±about 15%, or ±about 14%, or ±about 13%, or ±about 12%, or ±about 11%, or ±about 10%, or ±about 9%, or ±about 8%, or ±about 7%, or ±about 6%, or ±about 5%, or ±about 4%, or ±about 3%, or ±about 2%, or ±about 1% could be selected as an acceptable tolerance.

"Comparing the one or more blend properties with corresponding reference properties" means comparing a reference property value or characteristic (e.g. values and characteristics listed in Tables II and III herein) with a preselected value or characteristic (e.g. values and characteristics of blends 4 and 6 of Table II herein).

These and other aspects are described further in the following experimental section and examples, which are purely illustrative.

Experimental Section

A blend study was conducted to evaluate blends of FAAE's into two base fuels: a U.S. base fuel and a European base fuel (sourced in the U.S., but representative of European production). These are labeled as Blend 1 and 2, respectively. Blends 3-6 are FAAE blends with U.S. base fuel. Blends 7-11 are FAAE blends with European base fuel. All the FAAE blends contain two FAMEs in this study and the total FAME content is 20% by volume. FAMEs studied were RME, SME, and PME. Details of the fuel blend matrix are shown in Table I.

TABLE I

Fuel blend matrix in volume %

| volume % | 1 US Base | 2 Eur Base | 3 US SME | 4 US SME PME | 5 US RME SME | 6 US SME PME | 7 Eur RME | 8 Eur SME PME | 9 Eur RME PME | 10 Eur RME SME | 11 Eur RME PME |
|---|---|---|---|---|---|---|---|---|---|---|---|
| US Base Fuel | 100 | | 80 | 80 | 80 | 80 | | | | | |
| European Base Fuel | | 100 | | | | | 80 | 80 | 80 | 80 | 80 |
| RME | | | | | 5 | | 20 | | 10 | 15 | 15 |
| SME | | | 20 | 10 | 15 | 15 | | 10 | | 5 | |
| PME | | | | 10 | | 5 | | 10 | 10 | | 5 |

Blending biodiesel with diesel fuel is known to impact the low temperature operability and oxidative stability of the fuel. However, different FAMEs contain different fatty acids and therefore may impact these properties to different degrees. For example, PME is expected to have worse low temperature quality than SME and RME but better oxidative stability. It was previously unknown how blends containing PME with either SME or RME might perform and whether blends could be optimized to maintain the oxidative stability advantage while minimizing low temperature performance disadvantages.

Example 1

U.S. Base Fuel Blends

The blends with the U.S. base fuel are shown in Table II. Blends 3 and 5 containing SME and RME showed the best overall low temperature results based on Cloud Point, Low Temperature Flow Test (LTFT), and Cold Filter Plugging Point (CFPP). However, oxidative stability was not retained, as shown by higher Iodine Value and by lower modified Rancimat values for these blends.

Blends 4 and 6 contained PME, and the cloud point and CFPP temperatures were significantly higher than the base fuel and the fuels containing only SME and RME.

However, Blend 4 gave very surprising results. Even though this blend had the highest cloud point and most PME, its CFPP was tower than Blend 6, which had less PME.

Blend 4 also had better LTFT results than Blend 6 and was equivalent to Blends 3 and 5. This was highly unexpected.

Furthermore, Blend 4, and to a lesser extent Blend 6, imparted significant advantages in other properties. Blend 4 produced the best Iodine value and modified Rancimat test results, suggesting advantages in oxidative stability. The ignition delay was shortened for Blend 4, leading to an increase in derived cetane number by 2-3 numbers. And the conductivity at 72° F. was highest for Blends 4 and 6 showing an advantage in this property.

Therefore, in the U.S. base fuel, an optimal combination of FAMEs can lead to simultaneous improvements in several properties such as oxidative stability, ignition quality, and/or conductivity, while minimizing or nearly eliminating disadvantages in other areas such as low temperature quality.

TABLE II

Results from biodiesels blended into U.S. base diesel fuel

| | | Blend | | | | |
|---|---|---|---|---|---|---|
| | | 1 | 3 | 4 | 5 | 6 |
| | | Petroleum Distillate | | | | |
| | | US Base | US Base | US Base | US Base | US Base |
| | | | | FAAE Combination | | |
| Description | Method Descriptions | none | SME | SME, PME | SME, RME | SME, PME |
| D2500, C. | Cloud Point of Petroleum Oils | −22 | −21 | −12 | −21 | −16 |
| D2624 Conductivi, PS/M | Conductivity | 0 | 20 | 58 | 23 | 47 |
| D2624 TEMP . . . , F. | Conductivity | 74 | 72 | 72 | 72 | 72 |
| D2624 Conductivi, PS/M | Conductivity | 0 | 8 | 6 | 3 | 14 |
| D2624 TEMP . . . , F. | Conductivity | 41 | 43 | 43 | 43 | 42 |
| D4539 TEMP . . . , C. | LTFT | | −9 | −11 | −10 | −3 |
| D6371 TEMP . . . , DEG. | CFPP | −26 | −28 | −19 | −28 | −12 |
| D6890 Ignition Delay, msec | IQT | 4.500 | 4.522 | 4.191 | 4.416 | 4.307 |
| D6890 IQT CN | IQT | 44.43 | 44.22 | 47.46 | 45.19 | 46.26 |
| EN14111 | Iodine Value | 11.5 | 29.6 | 18.3 | 27.7 | 28.1 |
| EN 14112 | modified Rancimat | | 10.63 | 23.75 | 14.88 | 16.32 |

Example 2

European Base Fuel Blends

An analogous set of blends and tests were carried out with the European base fuel. Results are shown in Table III. With this base fuel, all of the FAME blends tested significantly raised the Cloud Point above the base fuel. The best LTFT results are seen in Blends 7 and 10 which contained only SME and RME. The CFPP results are surprising as Blends 7 and 10 give better results than base fuel. However, once again, oxidative stability is not optimized for Blends 7 and 10, as indicated by higher Iodine Value and by lower modified Rancimat values for these blends.

Blends 8, 9 and 11 contain PME. Although the cloud point was similar to the other blends with FAMEs, the LTFT and CFPP were higher with these blends than the other blends containing only SME and RME. Blends 8 and 9 had a higher percentage of PME than Blend 11 and with this base fuel, the blends with higher PME quantities produced worse LTFT and CFPP.

Other properties were also investigated. Blends containing PME again produced the best Iodine value and modified Rancimat test results, suggesting advantages in oxidative stability. The ignition delay was shortened for Blends 8, 9, and 11, leading to an increase in derived cetane number by 2-4 numbers. Blend 11 is particularly interesting, as most of the ignition quality benefit has been attained while minimizing the debits in low temperature tests. Interestingly, the conductivity at 71° F. and 42° F. did not show a general trend of higher conductivity values for Blends 8, 9, and 11. However, the data does indicate perhaps an advantage for blends containing both SME and PME, as the highest conductivity values measured at 71-72° F. test temperature in both the U.S. and European base fuel contained 10% SME and 10% PME.

These results with European base fuel, while showing some surprising results, are in general more in line with expectation than the results with the U.S. base fuel. Therefore, this data shows that FAME optimization is highly base fuel dependent. In each case, different FAMEs respond differently and provide different characteristics. However, an optimal combination of FAMEs can lead to simultaneous improvements in several properties such as oxidative stability, ignition quality, and/or conductivity, while minimizing or nearly eliminating debits in other areas such as low temperature quality. It is also possible to optimize a particular property by judicious selection of FAMEs blended into each selected base diesel fuel.

TABLE III

Results from biodiesels blended into European base diesel fuel

| | | Blend | | | | | |
|---|---|---|---|---|---|---|---|
| | | 2 | 7 | 8 | 9 | 10 | 11 |
| | | Petroleum Distillate | | | | | |
| | | Eur Base | Eur Base | Eur Base | Eur Base | Eur Base | Eur Base |
| | | | | FAAE Combination | | | |
| Description | Method Descriptions | none | RME | SME, PME | RME, PME | RME, SME | RME, PME |
| D2500, C. | Cloud Point of Petroleum Oils | −14 | −5 | −6 | −6 | −6 | −6 |
| D2624 Conductivi, PS/M | Conductivity | 164 | 122 | 175 | 147 | 143 | 143 |
| D2624 TEMP . . . , F. | Conductivity | 74 | 72 | 71 | 71 | 71 | 71 |
| D2624 Conductivi, PS/M | Conductivity | 103 | 80 | 77 | 66 | 88 | 55 |
| D2624 TEMP . . . , F. | Conductivity | 43 | 42 | 42 | 42 | 42 | 42 |
| D4539 TEMP . . . , C. | LTFT | | −8 | 1 | 1 | −8 | −4 |
| D6371 TEMP . . . , DEG. | CFPP | −12 | −14 | −11 | −11 | −14 | −12 |
| D6890 Ignition Delay, msec | IQT | 4.087 | 3.944 | 3.871 | 3.772 | 3.943 | 3.808 |
| D6890 IQT CN | IQT | 48.64 | 50.34 | 51.29 | 52.66 | 50.37 | 52.16 |
| EN14111 | Iodine Value | 0 | 25.8 | 24.6 | 17.9 | 25.8 | 19.4 |
| EN 14112 | modified Rancimat | | 14.39 | 22.43 | 23.39 | 16.98 | 18.94 |

It is to be understood that the above description is intended for illustrative purposes only, and is not intended to limit the scope of the present invention in any way.

What is claimed is:

1. A method of making a biofuel blend, the method comprising:
   (a) blending a sample of a petroleum distillate feedstock with a selected volumetric percentage of two or more fatty acid alkyl ester-containing biofuels;
   (b) determining one or more blend properties selected from the group consisting of cloud point, low temperature flow, cold filter plugging point, oxidative stability, cetane number, ignition quality, and conductivity;
   (c) comparing the one or more blend properties with corresponding reference properties selected from one or more of the following: i) a cloud point of about −16 to about −6° C., ii) a conductivity of about 47 to about 143 pS/M, iii) a low temperature flow temperature of about −11 to about −3° C., iv) a cold filter plugging point of about −19 to about −12° C., v) an ignition quality of about 3.8 to about 4.4 msec, and vi) a modified Rancimat value of about 18.9 to about 23.8; and
   (d) (1) if the one or more blend properties correlate with the corresponding reference properties within an acceptable tolerance, blending the petroleum distillate feedstock with the selected volumetric percentage of the two or more fatty acid alkyl ester-containing biofuels, or
   (2) if the one or more blend properties do not correlate with the corresponding reference properties within the acceptable tolerance, varying the selected volumetric percentage, composition, and/or number of the two or more fatty acid alkyl ester-containing biofuels and repeating steps (a) through (c) until the one or more blend properties correlate with the corresponding reference properties within the acceptable tolerance.

2. The method of claim 1, wherein the biofuel blend comprises between about 60% to about 90% by volume of a petroleum distillate and between about 10% to about 40% by volume of two or more fatty acid alkyl ester-containing biofuels.

3. The method of claim 1, wherein the petroleum distillate is a diesel or a jet fuel.

4. The method of claim 1, wherein the two or more fatty acid alkyl ester-containing biofuels are selected from the group consisting of soybean oil alkyl ester, rapeseed oil alkyl ester, palm oil alkyl ester, canola oil alkyl ester, sunflower oil alkyl ester, olive oil alkyl ester, corn oil alkyl ester, tallow oil alkyl ester, coconut oil alkyl ester, jatropha oil alkyl ester, yellow grease alkyl ester, animal fat alkyl ester, used cooking oil alkyl ester, and alkyl esters formed by the transesterification of either algae-derived triglycerides or oils from halophytes.

5. The method of claim 1, wherein the sample of the petroleum distillate feedstock is obtained from a refinery slip stream.

6. The method of claim 1, wherein the biofuel blend is a biodiesel blend which comprises between about 75% to about 85% by volume of a diesel, about 5% to about 15% by volume of palm oil methyl ester, and about 5% to about 15% by volume of either soybean oil methyl ester or rapeseed oil methyl ester.

7. The method of claim 1, further comprising adding an oxygenated component to the biofuel blend.

8. A method of making a biofuel blend, the method comprising:
(a) blending a sample of a petroleum distillate feedstock with a selected volumetric percentage of two or more fatty acid alkyl ester-containing biofuels;
(b) determining one or more blend properties selected from the group consisting of oxidative stability, ignition quality, and conductivity;
(c) comparing the one or more blend properties with corresponding reference properties selected from one or more of the following: i) a cloud point of about −16 to about −6° C., ii) a conductivity of about 47 to about 143 pS/M, iii) a low temperature flow temperature of about −11 to about −3° C., iv) a cold filter plugging point of about −19 to about −12° C., v) an ignition quality of about 3.8 to about 4.4 msec, and vi) a modified Rancimat value of about 18.9 to about 23.8; and
(d) (1) if the one or more blend properties correlate with the corresponding reference properties within an acceptable tolerance, blending the petroleum distillate feedstock with the selected volumetric percentage of the two or more fatty acid alkyl ester-containing biofuels, or
(2) if the one or more blend properties do not correlate with the corresponding reference properties within the acceptable tolerance, varying the selected volumetric percentage, composition, and/or number of the two or more fatty acid alkyl ester-containing biofuels and repeating steps (a) through (c) until the one or more blend properties correlate with the corresponding reference properties within the acceptable tolerance.

9. A method of making a biofuel blend, the method comprising:
(a) blending between 75% to 85% by volume of a sample of a petroleum distillate feedstock with 5% to 15% by volume of palm oil methyl ester and 5% to 15% by volume of either soybean oil methyl ester or rapeseed oil methyl ester;
(b) determining one or more blend properties selected from the group consisting of cloud point (ASTM D2500), low temperature flow test (LTFT, ASTM D4539), cold filter plugging point (CFPP, ASTM D6371), oxidative stability as modified Rancimat test (EN14112), cetane number (CN, ASTM D6890), ignition delay (ASTM D6890), iodine value (EN14111), conductivity at 22° C. (ASTM D2624), and conductivity at 6° C. (ASTM D2624);
(c) comparing the one or more blend properties with corresponding reference properties, wherein the corresponding reference properties are preselected values or characteristics selected from the group consisting of i) a cloud point of about −16 to about −6° C., ii) a conductivity of about 47 to about 143 pS/M, iii) a low temperature flow temperature of about −11 to about −3° C., iv) a cold filter plugging point of about −19 to about −12° C., v) an ignition quality of about 3.8 to about 4.4 msec, vi) and a modified Rancimat value of about 18.9 to about 23.8; and
(d) (1) if the one or more blend properties correlate with the corresponding reference properties within an acceptable tolerance of ±50%, blending the petroleum distillate feedstock with the selected volumetric percentage of the two or more fatty acid alkyl ester-containing biofuels, or
(2) if the one or more blend properties do not correlate with the corresponding reference properties within the acceptable tolerance of ±50%, varying the selected volumetric percentage, composition, and/or number of the two or more fatty acid alkyl ester-containing biofuels and repeating steps (a) through (c) until the one or more blend properties correlate with the corresponding reference properties within the acceptable tolerance of ±50%.

* * * * *